(12) United States Patent
Xue et al.

(10) Patent No.: US 12,236,788 B2
(45) Date of Patent: Feb. 25, 2025

(54) METHOD AND DEVICE FOR LANE-CHANGING PREDICTION OF TARGET VEHICLE

(71) Applicant: NIO TECHNOLOGY (ANHUI) CO., LTD, Hefei (CN)

(72) Inventors: Ruonan Xue, Shanghai (CN); Binbin Lin, Shanghai (CN); Ping Zhou, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 281 days.

(21) Appl. No.: 17/748,234

(22) Filed: May 19, 2022

(65) Prior Publication Data

US 2022/0375349 A1 Nov. 24, 2022

(30) Foreign Application Priority Data

May 21, 2021 (CN) .......................... 202110562398.8

(51) Int. Cl.
*G08G 1/16* (2006.01)
*B60W 40/105* (2012.01)

(52) U.S. Cl.
CPC ........... *G08G 1/167* (2013.01); *B60W 40/105* (2013.01); *B60W 2520/10* (2013.01); *B60W 2520/12* (2013.01); *B60W 2552/53* (2020.02); *B60W 2554/4045* (2020.02)

(58) Field of Classification Search
None
See application file for complete search history.

(56) References Cited

U.S. PATENT DOCUMENTS

2021/0114604 A1* 4/2021 Nagaraja ........... B60W 50/0097

FOREIGN PATENT DOCUMENTS

| CN | 101089917 A | * | 12/2007 |
| CN | 112053589 | | 12/2020 |

OTHER PUBLICATIONS

Dou et al. "Lane Changing Prediction at Highway Lane Drops Using Support Vector Machine and Artificial Neural Network Classifiers," IEEE, 2016 IEEE International Conference on Advanced Intelligent Mechatronics (AIM), Jul. 2016, pp. 901-906.

(Continued)

*Primary Examiner* — Jaime Figueroa
*Assistant Examiner* — Jerrod Irvin Davis
(74) *Attorney, Agent, or Firm* — Sheridan Ross P.C.

(57) ABSTRACT

The invention relates to a method for lane-changing prediction of a target vehicle, the method including: receiving a velocity and a position of the target vehicle; respectively obtaining, based on the velocity and the position of the target vehicle, a first lane-changing probability and a second lane-changing probability of the target vehicle by using a first machine learning model and a second machine learning model; and determining a possibility of lane changing of the target vehicle based on the first lane-changing probability and the second lane-changing probability, the first machine learning model and the second machine learning model being pre-trained and being different from each other. The invention further relates to a device for lane-changing prediction of a target vehicle, a computer storage medium, and a vehicle.

13 Claims, 2 Drawing Sheets

(56) References Cited

OTHER PUBLICATIONS

Remmen et al. "Cut-in Scenario Prediction for Automated Vehicles," IEEE, 2018 IEEE International Conference on Vehicular Electronics and Safety (ICVES), Sep. 2018, 7 pages.
Shou et al. "Long-Term Prediction of Lane Change Maneuver Through a Multilayer Perception," IEEE, 2020 IEEE Intelligent Vehicles Symposium (IV), Oct. 2020, pp. 246-252.
Sonka et al. "Dual Approach for Maneuver Classification in Vehicle Environment Data," IEEE, 2017 IEEE Intelligent Vehicles Symposium (IV), Jun. 2017, pp. 97-102.
Extended Search Report for European Patent Application No. 22165556.6, dated Sep. 28, 2022, 10 pages.

* cited by examiner

METHOD AND DEVICE FOR LANE-CHANGING PREDICTION OF TARGET VEHICLE

CROSS-REFERENCE TO RELATED APPLICATIONS

This application claims the benefit of China Patent Application No. 202110562398.8 filed May 21, 2021, the entire contents of which are incorporated herein by reference in its entirety.

TECHNICAL FIELD

The invention relates to the field of lane-changing prediction of a target vehicle, and in particular, to a method and device for lane-changing prediction of a target vehicle, a computer storage medium, and a vehicle.

BACKGROUND ART

Dynamic movement of other moving vehicles on a road has critical influences on road traffic safety. For example, in advanced driver assistance systems, the selection of a driving strategy for intelligent connected vehicles needs to take into consideration motion behaviors of other vehicles, mainly including lane changing and lane keeping of the other vehicles, where the lane changing of the vehicles poses a significant threat to road traffic safety. Therefore, the prediction of a lane-changing intention of vehicles on two sides of a present vehicle on a road can effectively prevent traffic incidents from happening and improve the driving safety.

At present, almost all existing solutions for prediction of a lane-changing intention of a vehicle implement prediction of lane-changing intention by using a single prediction module, without taking into consideration erroneous determinations that may be caused by a single model. Therefore, an improved solution for lane-changing prediction of a target vehicle is desired.

SUMMARY OF THE INVENTION

According to an aspect of the invention, there is provided a method for lane-changing prediction of a target vehicle, the method including: receiving a velocity and a position of the target vehicle; respectively obtaining, based on the velocity and the position of the target vehicle, a first lane-changing probability and a second lane-changing probability of the target vehicle by using a first machine learning model and a second machine learning model; and determining a possibility of lane changing of the target vehicle based on the first lane-changing probability and the second lane-changing probability, the first machine learning model and the second machine learning model being pre-trained and being different from each other.

As a supplement or an alternative to the above solution, in the above method, the velocity and the position of the target vehicle include: a longitudinal distance $d_x$ of the target vehicle in a vehicle coordinate system of a present vehicle; a lateral distance $d_{y\_ccs}$ of the target vehicle in a lane line coordinate system; and a lateral velocity $v_{y\_ccs}$ and a longitudinal velocity $v_{x\_ccs}$ of the target vehicle in the lane line coordinate system.

As a supplement or an alternative to the above solution, in the above method, the first machine learning model is trained by using at least the lateral distance $d_{y\_ccs}$ of the target vehicle in the lane line coordinate system and the lateral velocity $v_{y\_ccs}$ of the target vehicle in the lane line coordinate system as feature parameters.

As a supplement or an alternative to the above solution, in the above method, the second machine learning model is trained by using at least the longitudinal distance $d_x$ of the target vehicle in the vehicle coordinate system of the present vehicle, the lateral distance $d_{y\_ccs}$ of the target vehicle in the lane line coordinate system, and the lateral velocity $v_{y\_ccs}$ and the longitudinal velocity $v_{x\_ccs}$ of the target vehicle in the lane line coordinate system as feature parameters.

As a supplement or an alternative to the above solution, in the above method, the first machine learning model uses a method of logistic regression, and calculates the first lane-changing probability P1 by using the following model:

$$P1 = \frac{1}{1 + e^{-\left(c_1 * fabs(d_{y\_ccs}) + c_2 * flag_{dir} + c_3 * cnt_{dy\_ccs} + c_4 * fabs(v_{y\_ccs}) + c_5\right)}},$$

where fabs (x) is a function that returns an absolute value, $flag_{dir}$ is used to define an orientation, $cnt_{dy\_ccs}$ represents a number of frames in which the vehicle continues to go left or continues to go right, and $c_1$ to $c_5$ are coefficients obtained after training of the first machine learning model.

As a supplement or an alternative to the above solution, in the above method, the second machine learning model uses a method of a support vector machine, and calculates the second lane-changing probability P2 by using the following model:

$$P2 = e_1 * d_x + e_2 * d_{y\_ccs} + e_3 * v_{x\_ccs} + e_4 * v_{y\_ccs},$$

where $e_1$ to $e_4$ are coefficients obtained after training of the second machine learning model.

As a supplement or an alternative to the above solution, in the above method, the determining a possibility of lane changing of the target vehicle based on the first lane-changing probability and the second lane-changing probability includes: when both the first lane-changing probability and the second lane-changing probability satisfy a threshold condition, considering lane-changing prediction of the target vehicle successful and outputting a lane-changing probability P of the target vehicle.

According to another aspect of the invention, there is provided a device for lane-changing prediction of a target vehicle, the device including: a receiving apparatus configured to receive a velocity and a position of the target vehicle; a calculation apparatus configured to respectively obtain, based on the velocity and the position of the target vehicle, a first lane-changing probability and a second lane-changing probability of the target vehicle by using a first machine learning model and a second machine learning model; and a determination apparatus configured to determine a possibility of lane changing of the target vehicle based on the first lane-changing probability and the second lane-changing probability, the first machine learning model and the second machine learning model being pre-trained and being different from each other.

As a supplement or an alternative to the above solution, in the above device, the velocity and the position of the target vehicle include: a longitudinal distance $d_x$ of the target vehicle in a vehicle coordinate system of a present vehicle; a lateral distance $d_{y\_ccs}$ of the target vehicle in a lane line coordinate system; and a lateral velocity $v_{y\_ccs}$ and a longitudinal velocity $v_{x\_ccs}$ of the target vehicle in the lane line coordinate system.

As a supplement or an alternative to the above solution, the above device further includes: a first training apparatus configured to train the first machine learning model, wherein at least the lateral distance $d_{y\_ccs}$ of the target vehicle in the lane line coordinate system and the lateral velocity $v_{y\_ccs}$ of the target vehicle in the lane line coordinate system are used as feature parameters for the first machine learning model.

As a supplement or an alternative to the above solution, the above device further includes: a second training apparatus configured to train the second machine learning model, wherein at least the longitudinal distance $d_x$ of the target vehicle in the vehicle coordinate system of the present vehicle, the lateral distance $d_{y\_ccs}$ of the target vehicle in the lane line coordinate system, and the lateral velocity $v_{y\_ccs}$ and the longitudinal velocity $v_{x\_ccs}$ of the target vehicle in the lane line coordinate system are used as feature parameters for the second machine learning model.

As a supplement or an alternative to the above solution, in the above device, the calculation apparatus is configured to calculate the first lane-changing probability P1 by using the following first machine learning model:

$$P1 = \frac{1}{1 + e^{-\left(c_1 * fabs(d_{y\_ccs}) + c_2 * flag_{dir} + c_3 * cnt_{dy\_ccs} + c_4 * fabs(v_{y\_ccs}) + c_5\right)}},$$

where fabs (x) is a function that returns an absolute value, $flag_{dir}$ is used to define an orientation, $cnt_{dy\_ccs}$ represents a number of frames in which the vehicle continues to go left or continues to go right, and $c_1$ to $c_5$ are coefficients obtained after training of the first machine learning model.

As a supplement or an alternative to the above solution, in the above device, the calculation apparatus is configured to calculate the second lane-changing probability P2 by using the following second machine learning model:

$$P2 = e_1 * d_x e_2 * d_{y\_ccs} e_3 * v_{x\_ccs} + e_4 * v_{y\_ccs}$$

where $e_1$ to $e_4$ are coefficients obtained after training of the second machine learning model.

As a supplement or an alternative to the above solution, in the above device, the determination apparatus is configured to: when both the first lane-changing probability and the second lane-changing probability satisfy a threshold condition, output a lane-changing probability P of the target vehicle.

According to still another aspect of the invention, there is provided a computer storage medium including instructions, where when the instructions are run, the method as described above is performed.

According to yet another aspect of the invention, there is provided a vehicle including the device as described above.

In the solutions for lane-changing prediction of a target vehicle according to the embodiments of the invention, two different models (namely, the first machine learning model and the second machine learning model) are combined to provide a comprehensive determination of a lane-changing intention of the target vehicle, such that the accuracy and stability of a prediction system is ensured, thereby improving the driving safety.

BRIEF DESCRIPTION OF THE DRAWINGS

The above and other objectives and advantages of the invention will be more thorough and clearer from the following detailed description in conjunction with the accompanying drawings, where the same or similar elements are represented by the same reference numerals.

DETAILED DESCRIPTION OF EMBODIMENTS

To make the objectives, technical solutions, and advantages of the invention clearer, specific embodiments of the invention will be described in further detail below with reference to the accompanying drawings. It can be understood that the specific embodiments described herein are used merely to explain the invention, rather than limit the invention.

In addition, it should also be noted that, for ease of description, the accompanying drawings show only parts related to the invention rather than all content of the invention. Before discussing exemplary embodiments in more detail, it should be noted that some exemplary embodiments are described as processes or methods that are depicted as flowcharts. Although the flowcharts describe various operations (or steps) as sequential processing, many of the operations may be implemented in parallel, concurrently, or simultaneously. In addition, the sequence of the operations may be rearranged. The processing may be terminated when its operations are completed, but it may also have additional steps not included in the accompanying drawings. The processing may correspond to methods, functions, procedures, subroutines, subprograms, and so on.

Although exemplary embodiments are described as using a plurality of units to perform exemplary processes, it should be understood that these exemplary processes may also be performed by one or more modules.

Moreover, control logic of the invention may be included on a computer-readable medium as executable program instructions, which are implemented by a processor or the like. Instances of the computer-readable medium include, but are not limited to, a ROM, a RAM, an optical disc, a magnetic tape, a floppy disk, a flash drive, a smart card, and an optical data storage apparatus. A computer-readable recording medium may also be distributed in a computer system connected to a network, so that the computer-readable medium is stored and implemented in a distributed manner, for example, through a vehicle telematics service or a controller area network (CAN).

It should be understood that the term "vehicle" or other similar terms used herein includes general motor vehicles, such as passenger vehicles (including sport utility vehicles, buses, trucks, etc.), various commercial vehicles, etc., and includes hybrid vehicles, electric vehicles, etc. A hybrid vehicle is a vehicle with two or more power sources, such as a vehicle powered by a gasoline engine and an electric motor.

Solutions for lane-changing prediction of a target vehicle according to various exemplary embodiments of the invention will be described below in detail with reference to the accompanying drawings.

Figure 1:
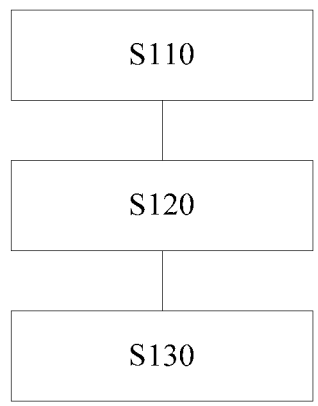
FIG. 1 is a schematic flowchart of a method for lane-changing prediction of a target vehicle according to an embodiment of the invention.

FIG. 1 is a schematic flowchart of a method 1000 for lane-changing prediction of a target vehicle according to an embodiment of the invention. As shown in FIG. 1, the method 1000 for lane-changing prediction of a target vehicle includes the following steps:

step S110 of receiving a velocity and a position of the target vehicle;

step S120 of respectively obtaining, based on the velocity and the position of the target vehicle, a first lane-changing probability and a second lane-changing probability of the target vehicle by using a first machine learning model and a second machine learning model; and step S130 of determining a possibility of lane changing of the target vehicle based on the first lane-changing probability and the second lane-changing probability, the first machine learning model and the second machine learning model being pre-trained and being different from each other.

In the context of the invention, the term "target vehicle" is another vehicle other than a present vehicle. In one or more embodiments, the target vehicle to be subjected to lane-changing prediction is on the front left or front right of the present vehicle.

Machine learning refers to a process of using some algorithms to guide a computer to obtain a proper model based on known data and then using the model to make a determination on a new situation. Therefore, in the context of the invention, the "first machine learning model" and the "second machine learning model" are different models obtained by a computer under the guidance of different algorithms, and the models may be used to determine (or predict) a lane-changing probability of the target vehicle.

The use of a single model for lane-changing prediction of the target vehicle may produce a large determination error. When it is erroneously determined that the target vehicle is in a state of lane changing, the present vehicle may erroneously brake because of the target vehicle, and when severe, traffic accidents, such as rear-end collision, may be caused. The use of the two models, namely, the first machine learning model and the second machine learning model, for lane-changing prediction of the target vehicle improves the accuracy of the lane-changing prediction of the target vehicle.

In an embodiment, in the above method 1000, the velocity and the position of the target vehicle include: a longitudinal distance $d_x$ of the target vehicle in a vehicle coordinate system of a present vehicle; a lateral distance $d_{y\_ccs}$ of the target vehicle in a lane line coordinate system; and a lateral velocity $v_{y\_ccs}$ and a longitudinal velocity $v_{x\_ccs}$ of the target vehicle in the lane line coordinate system.

Figure 3:
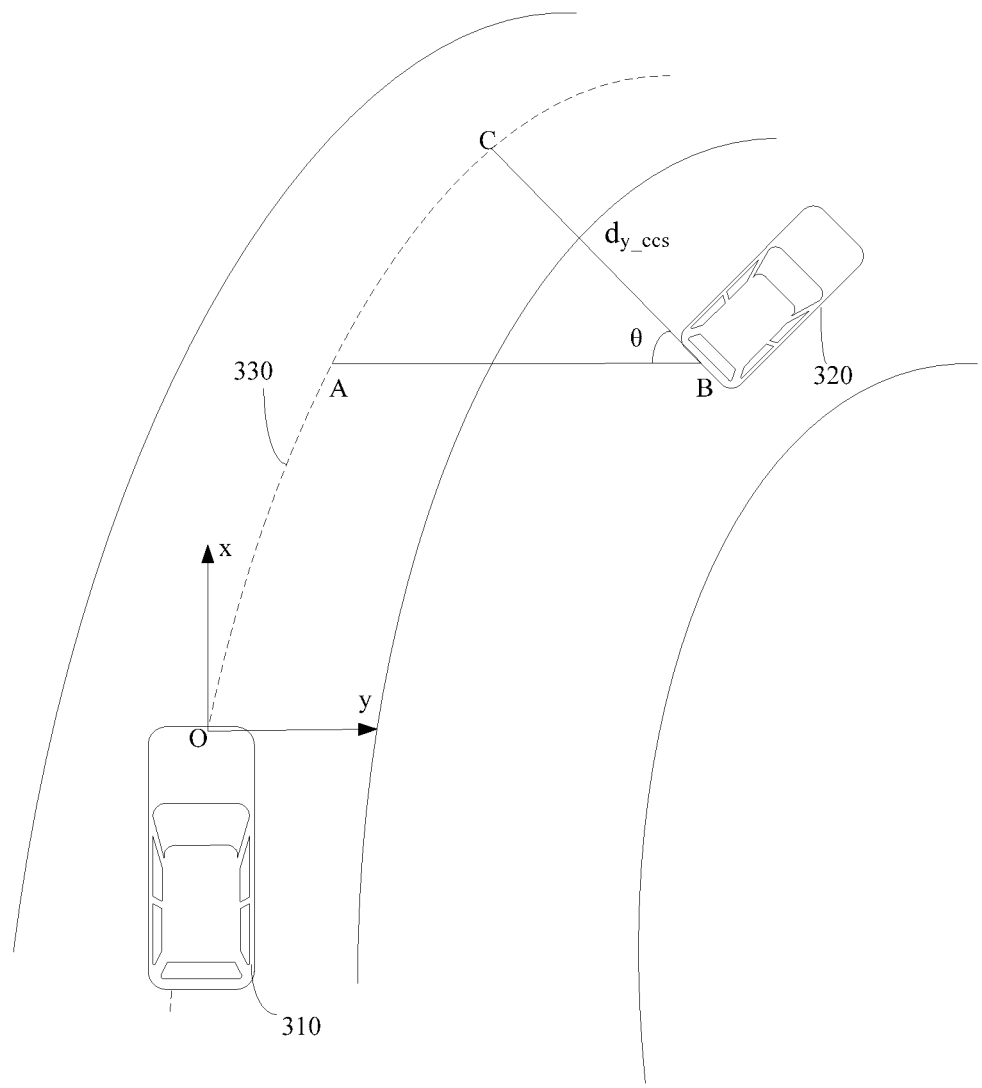
FIG. 3 is a schematic diagram of a scenario of predicting a lane-changing probability of a target vehicle based on a motion status of the target vehicle, according to an embodiment of the invention.

For example, FIG. 3 is a schematic diagram of a scenario 3000 of predicting a lane-changing probability of a target vehicle based on a motion status of the target vehicle. In the scenario 3000, a present vehicle is denoted by a reference numeral 310, and the target vehicle is denoted by a reference numeral 320. In a vehicle coordinate system of the present vehicle, a center of a front bumper of the vehicle is, for example, used as an origin, which is denoted by a point O in FIG. 3. In an embodiment, a lane line coordinate system may be a Frenet coordinate system, in which a lane centerline is used as a reference line, and variables s and d are used to describe positions of the vehicle on a road. The s coordinates represent a distance along the road (also referred to as a longitudinal displacement or a longitudinal distance), and the d coordinates represent a position relative to the left or right of the road (also referred to as a lateral displacement or a lateral distance). In FIG. 3, a projection point of the vehicle 320 on the reference line (namely, a lane centerline 330) is C, and therefore, a distance between the point C and a lateral position B of the target vehicle 320 in the vehicle coordinate system is the lateral distance $d_{y\_ccs}$ of the target vehicle in the lane line coordinate system.

In FIG. 3, a point A represents a position on the lane centerline at a longitudinal position of the target vehicle 320. Therefore, in an embodiment, the lateral distance of the target vehicle in the lane line coordinate system $d_{y\_ccs}=AB*\cos\theta$, where $\cos\theta$ may be calculated based on a slope of the lane centerline.

In an embodiment, the first machine learning model is trained by using at least the lateral distance $d_{y\_ccs}$ of the target vehicle in the lane line coordinate system and the lateral velocity $v_{y\_ccs}$ of the target vehicle in the lane line coordinate system as feature parameters. For example, the first machine learning model uses a method of logistic regression, and calculates the first lane-changing probability P1 by using the following model:

$$P1 = \frac{1}{1 + e^{-\left(c_1*fabs(d_{y\_ccs})+c_2*flag_{dir}+c_3*cnt_{dy\_ccs}+c_4*fabs(v_{y\_ccs})+c_5\right)}},$$

where fabs (x) is a function that returns an absolute value, $flag_{dir}$ is used to define an orientation (for example, −1 on the left side, and 1 on the right side), and $cnt_{dy\_ccs}$ represents a number of frames in which the vehicle continues to go left or continues to go right (where the number of frames here refers to a number of system running frames, for example, 50 frames/time). During the prediction of whether the target vehicle will go left, if $d_{y\_ccs}$ of the target vehicle increasingly decreases, cnt increasingly increases. $c_1$ to $c_5$ are coefficients obtained after training of the first machine learning model. In an embodiment, the model parameters $c_1$ to $c_5$ are obtained after training, by using a big data learning method, based on the velocity and the position of the target vehicle. Then, the velocity and the position of the target vehicle can be input to obtain a probability value of lane changing of the target vehicle.

In an embodiment, the second machine learning model is trained by using at least the longitudinal distance $d_x$ of the target vehicle in the vehicle coordinate system of the present vehicle, the lateral distance $d_{y\_ccs}$ of the target vehicle in the lane line coordinate system, and the lateral velocity $v_{y\_ccs}$ and the longitudinal velocity $v_{x\_ccs}$ of the target vehicle in the lane line coordinate system as feature parameters. In an example, the second machine learning model uses a method of a support vector machine, and calculates the second lane-changing probability P2 by using the following model:

$$P2=e_1*d_x+e_2*d_{y\_ccs}+e_3*v_{x\_ccs}+e_4*v_{y\_ccs},$$

where $e_1$ to $e_4$ are coefficients obtained after training of the second machine learning model.

In an embodiment, step S130 includes: when both the first lane-changing probability and the second lane-changing probability satisfy a threshold condition, considering lane-changing prediction of the target vehicle successful and outputting a lane-changing probability P of the target vehicle. In an alternative embodiment, step S130 includes: when the first lane-changing probability P1 satisfies a first threshold and the second lane-changing probability P2 satisfies a second threshold, outputting a final lane-changing probability P=(P1+P2)/2. In another alternative embodiment, a final lane-changing probability P=w1*P1+w2*P2, where w1 and w2 are weights and may be adjusted as needed.

In addition, those skilled in the art readily understand that the method for lane-changing prediction of a target vehicle provided in the one or more embodiments of the invention can be implemented by using a computer program. For example, when a computer storage medium (for example, a USB flash drive) storing the computer program is connected to a computer, the method for lane-changing prediction of a target vehicle according to one or more embodiments of the invention can be performed by executing the computer program.

Figure 2:
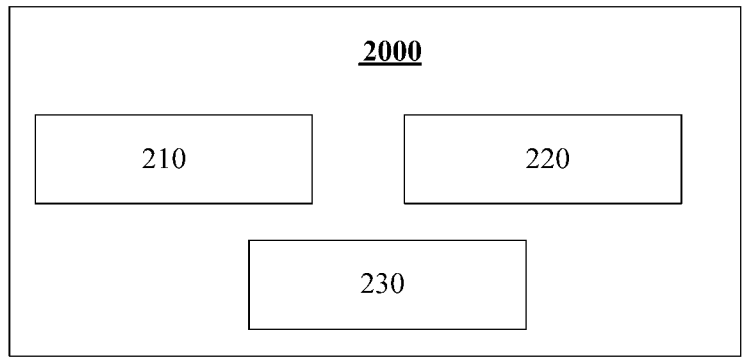
FIG. 2 is a schematic structural diagram of a device for lane-changing prediction of a target vehicle according to an embodiment of the invention.

With reference to FIG. 2, FIG. 2 is a schematic structural diagram of a device 2000 for lane-changing prediction of a target vehicle according to an embodiment of the invention. As shown in FIG. 2, the device 2000 for lane-changing prediction of a target vehicle includes: a receiving apparatus 210, a calculation apparatus 220, and a determination apparatus 230. The receiving apparatus 210 is configured to receive a velocity and a position of the target vehicle; the calculation apparatus 220 is configured to respectively obtain, based on the velocity and the position of the target vehicle, a first lane-changing probability and a second lane-changing probability of the target vehicle by using a first machine learning model and a second machine learning model; and the determination apparatus 230 is configured to determine a possibility of lane changing of the target vehicle based on the first lane-changing probability and the second lane-changing probability, the first machine learning model and the second machine learning model being pre-trained and being different from each other.

In the context of the invention, the term "target vehicle" is another vehicle other than a present vehicle. In one or more embodiments, the target vehicle to be subjected to lane-changing prediction is on the front left or front right of the present vehicle.

Machine learning refers to a process of using some algorithms to guide a computer to obtain a proper model based on known data and then using the model to make a determination on a new situation. Therefore, in the context of the invention, the "first machine learning model" and the "second machine learning model" are different models obtained by a computer under the guidance of different algorithms, and the models may be used to determine (or predict) a lane-changing probability of the target vehicle.

The use of a single model for lane-changing prediction of the target vehicle may produce a large determination error. When it is erroneously determined that the target vehicle is in a state of lane changing, the present vehicle may erroneously brake because of the target vehicle, and when severe, traffic accidents, such as rear-end collision, may be caused. The device 2000 for lane-changing prediction of a target vehicle uses the two models, namely, the first machine learning model and the second machine learning model, for lane-changing prediction of the target vehicle, thereby improving the accuracy of the lane-changing prediction of the target vehicle.

In an embodiment, the velocity and the position of the target vehicle include: a longitudinal distance $d_x$ of the target vehicle in a vehicle coordinate system of a present vehicle; a lateral distance $d_{y\_ccs}$ of the target vehicle in a lane line coordinate system; and a lateral velocity $v_{y\_ccs}$ and a longitudinal velocity $v_{x\_ccs}$ of the target vehicle in the lane line coordinate system.

With reference to FIG. 3, it is a schematic diagram of a scenario 3000 of predicting a lane-changing probability of a target vehicle based on a motion status of the target vehicle. In the scenario 3000, a present vehicle is denoted by a reference numeral 310, and the target vehicle is denoted by a reference numeral 320. In a vehicle coordinate system of the present vehicle, a center of a front bumper of the vehicle is, for example, used as an origin, which is denoted by a point O in FIG. 3. In an embodiment, a lane line coordinate system may be a Frenet coordinate system, in which a lane centerline is used as a reference line, and variables s and d are used to describe positions of the vehicle on a road. The s coordinates represent a distance along the road (also referred to as a longitudinal displacement or a longitudinal distance), and the d coordinates represent a position relative to the left or right of the road (also referred to as a lateral displacement or a lateral distance). In FIG. 3, a projection point of the vehicle 320 on the reference line (namely, a lane centerline 330) is C, and therefore, a distance between the point C and a lateral position B of the target vehicle 320 in the vehicle coordinate system is the lateral distance $d_{y\_ccs}$ of the target vehicle in the lane line coordinate system.

In FIG. 3, a point A represents a position on the lane centerline at a longitudinal position of the target vehicle 320. Therefore, in an embodiment, the lateral distance of the target vehicle in the lane line coordinate system $d_{y\_ccs}$=AB*cos θ, where cos θ may be calculated based on a slope of the lane centerline.

Although not shown in FIG. 2, in an embodiment, the device 2000 may further include: a first training apparatus configured to train the first machine learning model, wherein at least the lateral distance $d_{y\_ccs}$ of the target vehicle in the lane line coordinate system and the lateral velocity $v_{y\_ccs}$ of the target vehicle in the lane line coordinate system are used as feature parameters for the first machine learning model. In an embodiment, the device 2000 may further include: a second training apparatus configured to train the second machine learning model, wherein at least the longitudinal distance $d_x$ of the target vehicle in the vehicle coordinate system of the present vehicle, the lateral distance $d_{y\_ccs}$ of the target vehicle in the lane line coordinate system, and the lateral velocity $v_{y\_ccs}$ and the longitudinal velocity $v_{x\_ccs}$ of the target vehicle in the lane line coordinate system are used as feature parameters for the second machine learning model.

Specifically, in an embodiment, the calculation apparatus 220 is configured to calculate the first lane-changing probability P1 by using the following first machine learning model:

$$P1 = \frac{1}{1 + e^{-\left(c_1 * fabs(d_{y\_ccs}) + c_2 * flag_{dir} + c_3 * cnt_{dy\_ccs} + c_4 * fabs(v_{y\_ccs}) + c_5\right)}},$$

where fabs (x) is a function that returns an absolute value, $flag_{dir}$ is used to define an orientation (for example, −1 on the left side, and 1 on the right side), and $cnt_{dy\_ccs}$ represents a number of frames in which the vehicle continues to go left or continues to go right (where the number of frames here refers to a number of system running frames, for example, 50 frames/time). During the prediction of whether the target vehicle will go left, if $d_{y\_ccs}$ of the target vehicle increasingly decreases, cnt increasingly increases. $c_1$ to $c_5$ are coefficients obtained after training of the first machine learning model. In an embodiment, the model parameters $c_1$ to $c_5$ are obtained after training, by using a big data learning method, based on the velocity and the position of the target vehicle. Then, the velocity and the position of the target vehicle can be input to obtain a probability value of lane changing of the target vehicle.

In an embodiment, the calculation apparatus 220 is configured to calculate the second lane-changing probability P2 by using the following second machine learning model:

$$P2 = e_1 * d_x + e_2 * d_{y\_ccs} + e_3 * v_{x\_ccs} + e_4 * v_{y\_ccs},$$

where $e_1$ to $e_4$ are coefficients obtained after training of the second machine learning model.

In an embodiment, the determination apparatus 230 is configured to: when both the first lane-changing probability and the second lane-changing probability satisfy a threshold condition, output a lane-changing probability P of the target vehicle. In an alternative embodiment, the determination apparatus 230 is configured to: when the first lane-changing probability P1 satisfies a first threshold and the second lane-changing probability P2 satisfies a second threshold, output a final lane-changing probability P=(P1+P2)/2. In another alternative embodiment, the determination apparatus 230 is configured to calculate the final lane-changing probability P according to the following formula, where P=w1*P1+w2*P2, and w1 and w2 are weights (which may be adjusted as needed).

In addition, the device 2000 for lane-changing prediction of a target vehicle according to one or more embodiments of the invention may be included in advanced driver assistance systems (ADAS). The advanced driver assistance systems (ADAS) may be installed in the vehicle in an embodiment.

The term "advanced driver assistance systems" is also referred to as ADAS. The advanced driver assistance systems use a variety of sensors (such as a millimeter-wave radar, a laser radar, a monocular/binocular camera, and satellite navigation) mounted on an automobile to sense the surrounding environment at any time during traveling of the automobile, collect data, identify, monitor, and track a still/moving object, and perform system operations and analysis in combination with navigation map data, allowing for a driver to be aware of potential dangers in advance, thereby effectively improving the comfort and safety of the automobile during traveling. In an embodiment, the advanced driver assistance systems include a traffic message channel (TMC) system, an intelligent speed adaptation or intelligent speed advice (ISA) system, a vehicular communication system, an adaptive cruise control (ACC) system, a lane departure warning system (LDWS), a lane keeping assistance system, a collision avoidance system or a pre-crash system, a night vision system, an adaptive light control system, a pedestrian protection system, an automatic parking system, a traffic sign recognition system, a blind spot detection system, a driver drowsiness detection system, a hill descent control system, and an electric vehicle warning sounds system.

In conclusion, in the solutions for lane-changing prediction of a target vehicle according to the embodiments of the invention, two different models (namely, the first machine learning model and the second machine learning model) are combined to provide a comprehensive determination of a lane-changing intention of the target vehicle, such that the accuracy and stability of a prediction system is ensured, thereby improving the driving safety.

Although only some embodiments of the invention are described in the specification, it will be appreciated by those skilled in the art that the invention may be embodied in many other forms without departing from the essence and scope thereof. Accordingly, the presented examples and implementations are considered to be illustrative rather than restrictive, and the invention may encompass various modifications and replacements without departing from the spirit and scope of the invention that are defined by the appended claims.

The invention claimed is:

1. A method for lane-changing prediction of a target vehicle, comprising:
   receiving a velocity and a position of the target vehicle, wherein the velocity and the position of the target vehicle comprise:
   a longitudinal distance $d_x$ of the target vehicle in a vehicle coordinate system of a present vehicle;
   a lateral distance $d_{y\_ccs}$ of the target vehicle in a lane line coordinate system; and
   a lateral velocity $V_{y\_ccs}$ and a longitudinal velocity $V_{x\_ccs}$ of the target vehicle in the lane line coordinate system;
   respectively obtaining, based on the velocity and the position of the target vehicle, a first lane-changing probability and a second lane-changing probability of the target vehicle by using a first machine learning model and a second machine learning model; and
   determining a possibility of lane changing of the target vehicle based on the first lane-changing probability and the second lane-changing probability, the first machine learning model and the second machine learning model being pre-trained and being different from each other.

2. The method according to claim 1, wherein the first machine learning model is trained by using at least the lateral distance $d_{y\_ccs}$ of the target vehicle in the lane line coordinate system and the lateral velocity $V_{y\_ccs}$ of the target vehicle in the lane line coordinate system as feature parameters.

3. The method according to claim 2, wherein the first machine learning model uses a method of logistic regression, and calculates the first lane-changing probability P1 by using the following model:

$$P1 = \frac{1}{1 + e^{-\left(c_1 * fabs(d_{y\_ccs}) + c_2 * flag_{dir} + c_3 * cnt_{dy\_ccs} + c_4 * fabs(v_{y\_ccs}) + c_5\right)}},$$

where fabs (x) is a function that returns an absolute value, $flag_{dir}$ is used to define an orientation, $cnt_{dy\_ccs}$ represents a number of frames in which the vehicle continues to go left or continues to go right, and $c_1$ to $c_5$ are coefficients obtained after training of the first machine learning model.

4. The method according to claim 1, wherein the second machine learning model is trained by using at least the longitudinal distance $d_x$ of the target vehicle in the vehicle coordinate system of the present vehicle, the lateral distance $d_{y\_ccs}$ of the target vehicle in the lane line coordinate system, and the lateral velocity $V_{y\_ccs}$ and the longitudinal velocity $V_{x\_ccs}$ of the target vehicle in the lane line coordinate system as feature parameters.

5. The method according to claim 4, wherein the second machine learning model uses a method of a support vector machine, and calculates the second lane-changing probability P2 by using the following model:

$$P2 = e_1 * d_x + e_2 * d_{y\_ccs} + e_3 * V_{x\_ccs} + e_4 * V_{y\_ccs},$$

where $e_1$ to $e_4$ are coefficients obtained after training of the second machine learning model.

6. The method according to claim 1, wherein the determining a possibility of lane changing of the target vehicle based on the first lane-changing probability and the second lane-changing probability comprises:
  when both the first lane-changing probability and the second lane-changing probability satisfy a threshold condition, considering lane-changing prediction of the target vehicle successful and outputting a lane-changing probability P of the target vehicle.

7. A device for lane-changing prediction of a target vehicle, comprising:
  a receiving apparatus configured to receive a velocity and a position of the target vehicle, wherein the velocity and the position of the target vehicle comprise:
    a longitudinal distance $d_x$ of the target vehicle in a vehicle coordinate system of a present vehicle;
    a lateral distance $d_{y\_ccs}$ of the target vehicle in a lane line coordinate system; and
    a lateral velocity $V_{y\_ccs}$ and a longitudinal velocity $V_{x\_ccs}$ of the target vehicle in the lane line coordinate system;
  a calculation apparatus configured to respectively obtain, based on the velocity and the position of the target vehicle, a first lane-changing probability and a second lane-changing probability of the target vehicle by using a first machine learning model and a second machine learning model; and
  a determination apparatus configured to determine a possibility of lane changing of the target vehicle based on the first lane-changing probability and the second lane-changing probability, the first machine learning model and the second machine learning model being pre-trained and being different from each other.

8. The device according to claim 7, further comprising: a first training apparatus configured to train the first machine learning model, wherein at least the lateral distance $d_{y\_ccs}$ of the target vehicle in the lane line coordinate system and the lateral velocity $V_{y\_ccs}$ of the target vehicle in the lane line coordinate system are used as feature parameters for the first machine learning model.

9. The device according to claim 8, wherein the calculation apparatus is configured to calculate the first lane-changing probability P1 by using the following first machine learning model:

$$P1 = \frac{1}{1 + e^{-\left(c_1 * fabs(d_{y\_ccs}) + c_2 * flag_{dir} + c_3 * cnt_{dy\_ccs} + c_4 * fabs(v_{y\_ccs}) + c_5\right)}},$$

where fabs (x) is a function that returns an absolute value, $flag_{dir}$ is used to define an orientation, $cnt_{dy\_ccs}$ represents a number of frames in which the vehicle continues to go left or continues to go right, and $c_1$ to $c_5$ are coefficients obtained after training of the first machine learning model.

10. The device according to claim 7, further comprising: a second training apparatus configured to train the second machine learning model, wherein at least the longitudinal distance $d_x$ of the target vehicle in the vehicle coordinate system of the present vehicle, the lateral distance $d_{y\_ccs}$ of the target vehicle in the lane line coordinate system, and the lateral velocity $V_{y\_ccs}$ and the longitudinal velocity $V_{x\_ccs}$ of the target vehicle in the lane line coordinate system are used as feature parameters for the second machine learning model.

11. The device according to claim 10, wherein the calculation apparatus is configured to calculate the second lane-changing probability P2 by using the following second machine learning model:

$$P2 = e_1 * d_x + e_2 * d_{y\_ccs} + e_3 * V_{x\_ccs} + e_4 * V_{y\_ccs},$$

where $e_1$ to $e_4$ are coefficients obtained after training of the second machine learning model.

12. The device according to claim 7, wherein the determination apparatus is configured to: when both the first lane-changing probability and the second lane-changing probability satisfy a threshold condition, output a lane-changing probability P of the target vehicle.

13. A computer storage medium, comprising instructions, wherein when the instructions are run, a method for lane-changing prediction of a target vehicle is performed, the method comprising:
  receiving a velocity and a position of the target vehicle, wherein the velocity and the position of the target vehicle comprise:
    a longitudinal distance $d_x$ of the target vehicle in a vehicle coordinate system of a present vehicle;
    a lateral distance $d_{y\_ccs}$ of the target vehicle in a lane line coordinate system; and
    a lateral velocity $V_{y\_ccs}$ and a longitudinal velocity $V_{x\_ccs}$ of the target vehicle in the lane line coordinate system;
  respectively obtaining, based on the velocity and the position of the target vehicle, a first lane-changing probability and a second lane-changing probability of the target vehicle by using a first machine learning model and a second machine learning model; and
  determining a possibility of lane changing of the target vehicle based on the first lane-changing probability and the second lane-changing probability, the first machine learning model and the second machine learning model being pre-trained and being different from each other.

* * * * *